Dec. 19, 1961  R. B. MURCHIE  3,013,550
PORTABLE OUTDOOR GRILL AND FIREBOX
Filed July 20, 1959  2 Sheets-Sheet 1
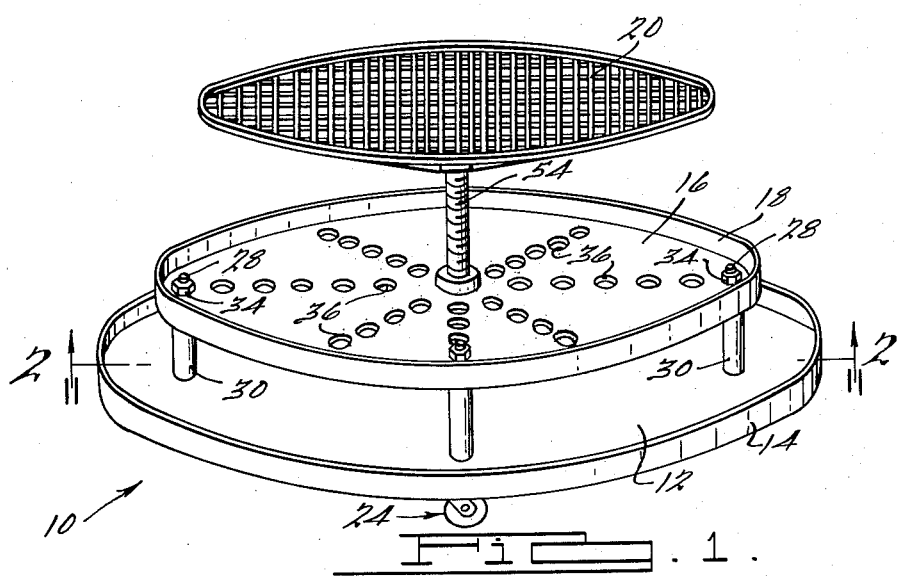
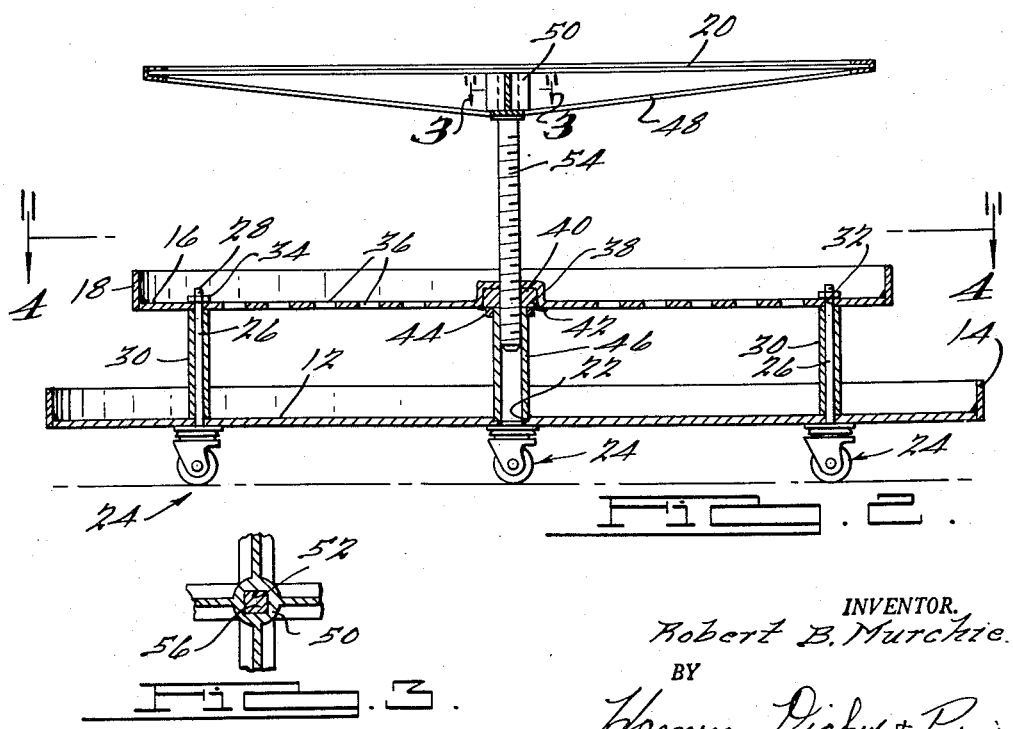
INVENTOR.
Robert B. Murchie.
BY
Harness, Dickey & Pierce
ATTORNEYS.

Dec. 19, 1961  R. B. MURCHIE  3,013,550
PORTABLE OUTDOOR GRILL AND FIREBOX
Filed July 20, 1959  2 Sheets-Sheet 2
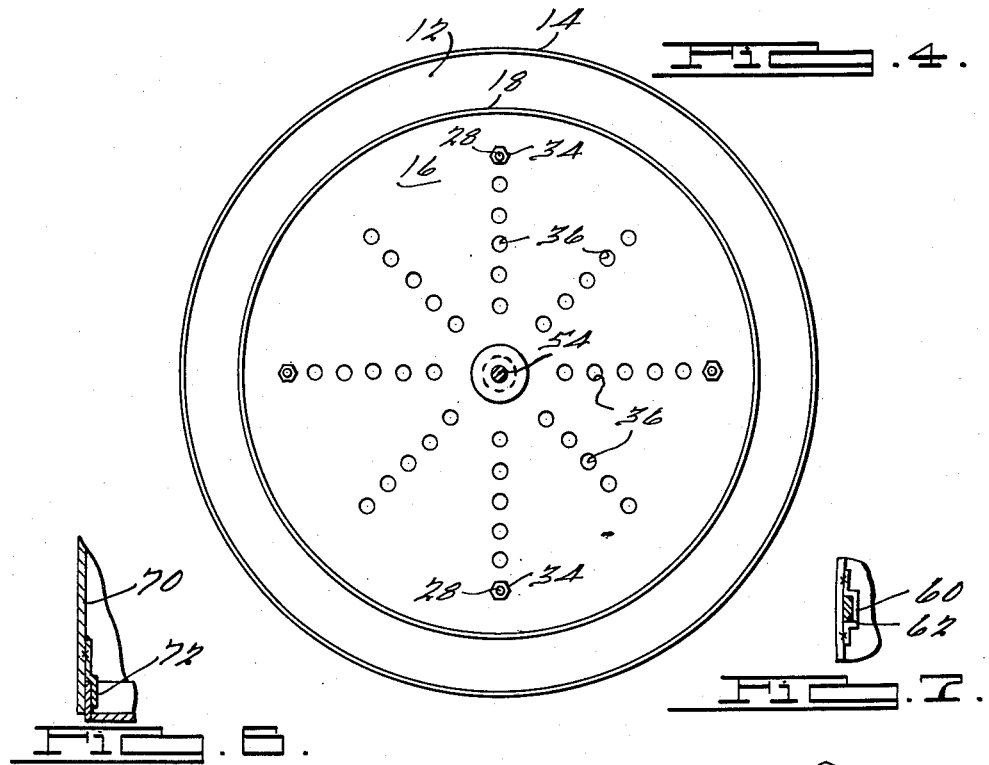
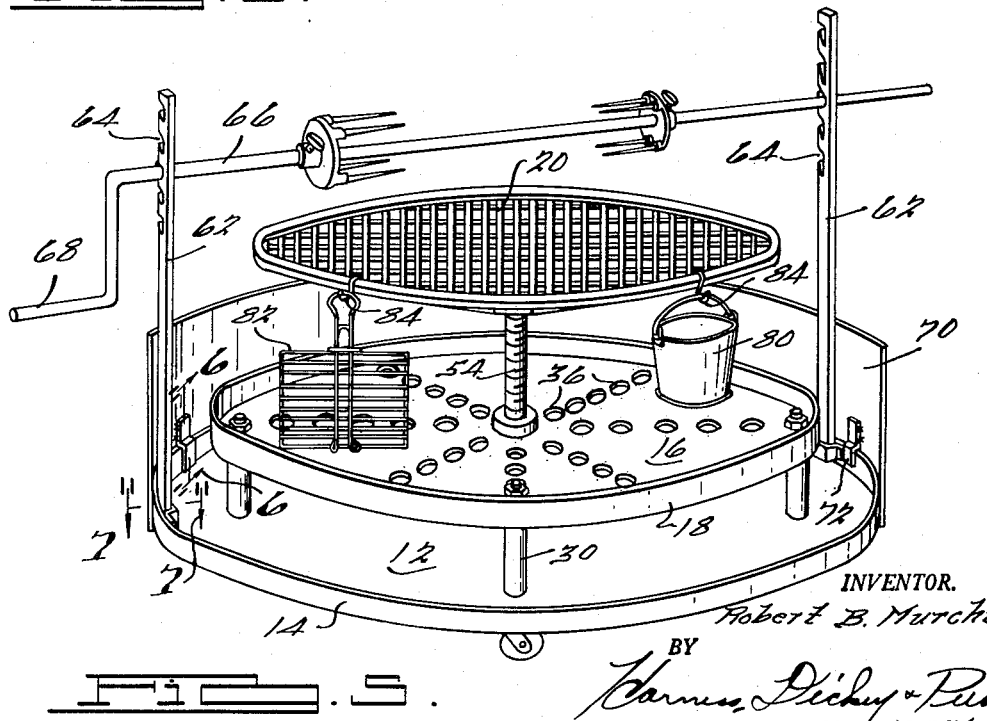
INVENTOR.
Robert B. Murchie
BY
Harness, Dickey & Pierce
ATTORNEYS United States Patent Office 3,013,550
Patented Dec. 19, 1961

3,013,550
PORTABLE OUTDOOR GRILL AND FIREBOX
Robert B. Murchie, Traverse City, Mich.
Filed July 20, 1959, Ser. No. 828,171
1 Claim. (Cl. 126—25)

This invention relates generally to outdoor cooking and heating devices and more particularly to a combination outdoor grill and firebox.

It is desirable, in an outdoor cooking and heating device, to be able to transport the device from one spot to another and to be able to regulate the application of heat to the food being cooked. A firebox which is large enough to accommodate an open log fire is also desirable. Accordingly, it is an object of this invention to provide a combination firebox and outdoor grill which has a large firebox mounted on casters and has its center of gravity located sufficiently close to the ground to facilitate movement of the device over the ground, to provide a grill or foraminous cooking surface which can be placed over the firebox and is large enough to accommodate long handled steakholders or baskets and the like and still leave room for items such as a pot of coffee, and to provide a device of this character which can be readily shipped in a compact disassembled condition.

A further object of this invention is to provide a combination firebox and outdoor grill in which the grill can be raised or lowered relative to the fire by the use of a fork or poker and to provide a location of the grill relative to the fire such that swivel hooks or the like can be hung from the grill to support a steakholder, a pail of water or coffee, or the like in positions in which they are exposed to the fire.

A further object of this invention is to provide a combination firebox and outdoor grill which is relatively simple in construction, economical to manufacture, and which is efficient in use in either providing an open outside log fire or in providing a large surface for cooking purposes.

Further objects, features and advantages of this invention will become apparent from a consideration of the following description, the appended claims and the accompanying drawing in which:

FIGURE 1 is a perspective view of the combination firebox and outdoor grill of this invention;

FIG. 2 is an enlarged sectional view looking substantially along the line 2—2 in FIG. 1;

FIG. 3 is an enlarged fragmentary sectional view looking substantially along the line 3—3 in FIG. 2;

FIG. 4 is a reduced sectional view looking substantially along the line 4—4 in FIG. 2;

FIG. 5 is a perspective view of the combination firebox and outdoor grill of this invention provided with a windbreaker plate, a spit, and hook-supported articles; and FIGS. 6 and 7 are enlarged sectional views looking along the lines 6—6 and 7—7 in FIG. 5.

With reference to the drawing, the combination outdoor grill and firebox of this invention, indicated generally at 10, is illustrated in FIG. 1 as consisting of a circular ash pan 12 having an upstanding peripheral flange 14, a fire plate 16 supported on the ash pan 12 and likewise having an upstanding peripheral flange 18 and a foraminous food-supporting member or grill 20 mounted on the fire plate 16. The ash pan 12, which is preferably formed as a sheet iron stamping, is provided with a central depression or cavity 22 which is of a predetermined diameter for a purpose to appear presently and surrounds a central opening 23.

Four caster units 24, each of which carries an upstanding stud 26 having a threaded terminal end portion 28 that projects upwardly through the ash pan 12, support the ash pan 12 in a position relatively close to the ground surface on which the casters 24 are supported. Pipe or sleeve members 30 are mounted on the studs 26 and support the fire plate 16 in a position spaced above the ash pan 12. The studs 26 extend upwardly through openings 32 in the fire plate 16 and nuts 34 threaded on the terminal end portions of the studs 26 positively clamp the fire plate 16 to the ash pan 12 at a position spaced above the ash pan 12.

The fire plate 16, which is preferably formed as a sheet iron stamping, is provided with a plurality of draft openings 36 and on its underside is provided with a central depression 38 of a size to accommodate an enlarged nut 40. The nut 40 is secured to the fire plate 16 by welding 42 and carries a downwardly extending guide sleeve 44 of a size to receive the upper end of a tubular guide member 46 therein. The depression 22 in the ash pan 12 is likewise of a diameter to receive the lower end of the guide member 46 therein. Consequently, with the lower end of the guide member 46 disposed in the depression 22 and with the upper end positioned within the sleeve 44, when the nuts 34 are applied to the studs 26 to clamp the fire plate 16 to the ash pan 12, the guide member 46 is likewise clamped in a fixed position between the ash pan 12 and the fire plate 16.

As clearly appears in FIG. 2, the fire plate 16 is of a diameter substantially less than the diameter of the ash pan 12. Consequently, when the grill is disassembled, the fire plate 16 can readily be supported within the ash pan 12 for shipping purposes. The grill member 20, which is likewise of a smaller diameter than the firebox 16 so that it can be mounted therein for shipping purposes, has a plurality of inclined reinforcing members 48 secured to its underside for supporting a tubular hub member 50 disposed centrally of and below the grill member 20. The member 50 has a square opening 52 of a size to receive the square upper end 56 of a screw shaft 54 which has its lower end portion threadably supported in the nut 40 and extending downwardly into the guide member 46.

Consequently, when the grill member 20 is rotated, the shaft 54 moves vertically in the nut 40 to adjust the position of the grill member 20 relative to the firebox 16. This rotation can readily be accomplished with the use of a fork or poker applied to the grill 20 which can also be used for towing the firebox and grill 10 from one position on the ground to another. Because the ash pan 12 is relatively close to the ground, and constitutes the major portion of the weight of the entire assembly, it can readily be moved.

A pair of socket members 60 are secured to the inner side of the rim 14 on the ash pan 12 so as to accommodate a pair of upstanding posts 62, each of which has a plurality of inclined slots 64 formed in one side thereof. The posts 62 are thus adapted to support a spit 66 having a handle 68 in a plurality of vertical positions depending on the slots 64 in which the spit 66 is supported. A curved metal windbreak member 70 has clips 72 which are engageable over the rim 14 for supporting the windbreak member 70 on the ash pan 12 as shown in FIG. 5. The position of the firebox and grill 10 is adjusted relative to the wind so that the windbreak member 70 is effective to limit the amount of wind which can enter the space between the ash pan 12 and the firebox 16. The fact that the grill 20 is of a diameter less than the diameter of the firebox 16 makes it possible to support items such as a pail 80 and a steak-supporting rack 82 on hooks 84 hung from the periphery of the grill 20 as shown in FIG. 5, in positions in which these items will be efficiently heated by the burning material in the firebox 16.

In the use of the firebox and grill 10 as a grill, a wood fire is started in the firebox 16, with the logs extending preferably radially in the firebox 16. If desired, a truncated cone-type support (not shown) may also be positioned in the firebox 16 so that the logs can be disposed in positons inclined upwardly and inwardly of the firebox 16. The food to be cooked is supported on the grill 20 which is of a sufficient size to accommodate large quantities and can readily be rotated to adjust the distance between the grill 20 and the fire plate 16 to regulate the amount of heat which is applied to the food. When it is desired to move the firebox and grill 10, a poker is merely hooked over one of the flanges 14 or 18 and the device is wheeled to the desired location. The grill 20 is readily removed by rotating it in a direction to withdraw the shaft 54 from the nut 40 so that the device is usable as a firebox for outdoor log fires. Because the ash pan 12 is spaced above the ground surface, there is no danger of damage to the sod.

Although the invention has been described with respect to a preferred embodiment thereof, it is to be understood that it is not to be so limited, since changes can be made therein which are within the scope of the invention as defined by the appended claim.

What is claimed is:

In an outdoor grill, an ash pan and fire plate assembly comprising a substantially circular ash pan having an upstanding peripheral rim, a fire plate of a substantially circular shape and of a diameter less than the diameter of said ash pan, said fire plate having draft openings therethrough, caster wheels mounted on said assembly and located directly below and adjacent to said ash pan, upstanding studs on said caster wheels projecting through said ash pan and said fire plate, spacer sleeves on said studs engaged at their ends with said ash pan and said fire plate for maintaining said fire plate spaced a predetermined distance above said ash pan, nut means on the upper ends of said studs engaged with said fire plate, and a foraminous food support of a substantially circular shape adjustably mounted on said assembly at a position above said fire plate for up and down movement relative thereto.

References Cited in the file of this patent
UNITED STATES PATENTS

| | | |
|---|---|---|
| 493,128 | Stow | Mar. 7, 1893 |
| 980,501 | Doll | Jan. 3, 1911 |
| 1,106,176 | Wormser | Aug. 4, 1914 |
| 1,438,345 | Tait | Dec. 12, 1922 |
| 1,552,854 | James | Sept. 18, 1925 |
| 1,570,651 | Topping | Jan. 26, 1926 |
| 2,158,236 | Haislip | May 16, 1939 |
| 2,506,698 | Beals | May 9, 1950 |
| 2,608,190 | Winning et al. | Aug. 26, 1952 |
| 2,627,854 | Sava | Feb. 10, 1953 |
| 2,742,892 | Herzer | Apr. 24, 1956 |
| 2,819,667 | Victor | Jan. 14, 1958 |

FOREIGN PATENTS

| | | |
|---|---|---|
| 14,030 | Great Britain | Nov. 16, 1895 |